(12) United States Patent
Kwak

(10) Patent No.: US 11,243,716 B2
(45) Date of Patent: Feb. 8, 2022

(54) MEMORY SYSTEM AND OPERATION METHOD THEREOF

(71) Applicant: SK hynix Inc., Gyeonggi-do (KR)

(72) Inventor: Chang-Min Kwak, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/571,979

(22) Filed: Sep. 16, 2019

(65) Prior Publication Data

US 2020/0201573 A1 Jun. 25, 2020

(30) Foreign Application Priority Data

Dec. 21, 2018 (KR) .......................... 10-2018-0167585

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0685* (2013.01)

(58) Field of Classification Search
CPC .... G06F 3/0685; G06F 3/0649; G06F 3/0604; G06F 3/0659; G06F 3/0644; G06F 2212/7201; G06F 2212/205; G06F 2212/1016; G06F 12/0292; G06F 2212/7203; G06F 12/0246; G06F 12/0284

USPC ......................................................... 711/163
See application file for complete search history.

(56) References Cited

U.S. PATENT DOCUMENTS

| | | | |
|---|---|---|---|
| 10,496,315 B1* | 12/2019 | Niu ........................ | G06F 3/0604 |
| 2015/0039837 A1* | 2/2015 | Quan ...................... | G06F 3/061 |
| | | | 711/136 |
| 2016/0210067 A1* | 7/2016 | Olson ..................... | G06F 3/064 |
| 2017/0277471 A1* | 9/2017 | Huang ................ | G06F 11/0793 |

FOREIGN PATENT DOCUMENTS

KR     10-2009-0017238     2/2009

\* cited by examiner

*Primary Examiner* — David Yi
*Assistant Examiner* — Zubair Ahmed
(74) *Attorney, Agent, or Firm* — IP & T Group LLP

(57) ABSTRACT

A memory system which includes a memory pool having a plurality of memory units and a controller suitable for controlling the plurality of memory units, wherein the controller includes a translation unit suitable for translating a system address into a local address within the memory pool, a threshold decision unit suitable for dynamically changing a threshold based on an a number of accesses to each local address for data within the memory pool, a data attribute determination unit suitable for determining an attribute of data associated with the translated local address based on the threshold and the number of accesses to the translated local address, and a data input/output unit suitable for controlling a memory unit associated with a new local address among the plurality memory units based on the attribute of the data.

17 Claims, 11 Drawing Sheets

MEMORY SYSTEM AND OPERATION METHOD THEREOF

CROSS-REFERENCE TO RELATED APPLICATION

This application claims priority under 35 U.S.C. § 119 to Korean Patent Application No. 10-2018-0167585 filed on Dec. 21, 2018, which is incorporated herein by reference in its entirety.

BACKGROUND

1. Field

Various embodiments relate to a memory system, and more particularly, to a memory system including a memory pool, and an operation method thereof.

2. Discussion of the Related Art

With the advent of the fourth industrial revolution generation, data have become one of the most important resources for businesses. Therefore, the demand for the latest technology capable of quickly transmitting and analyzing large-scale data is gradually increasing. For example, the spread of artificial intelligence (AI), autonomous driving, robot, health care, virtual reality (VR), augmented reality (AR) and smart home will increase the demand for servers or data centers.

A legacy data center has a structure including resources (for example, computing, networking and storage) in one piece of equipment. However, upcoming large-scale data centers may have a structure that separately configures resources and logically reconfigures resources. For example, a large-scale data center may have a structure that can modularize resources at the rack level, reconfigure the resources depending on their intended use, and supply the resources. Therefore, there is a demand for an integrated storage or memory device suitable for being used for an upcoming large-scale data center.

SUMMARY

Various embodiments are directed to a memory system which determines data attributes, for example hot or cold data, according to access counts of local addresses, respectively, and sorts and stores data having different attributes in a memory pool, and an operation method thereof.

In an embodiment, a memory system may include: a memory pool including a plurality of memory units; and a controller suitable for controlling the plurality of memory units, wherein the controller includes: a translation unit suitable for translating a system address into a local address within the memory pool, the system address being received with an access command from a host; a threshold decision unit suitable for dynamically changing a threshold based on a number of accesses to each local address for data within the memory pool; a data attribute determination unit suitable for determining an attribute of data associated with the translated local address based on the threshold and the number of accesses to the translated local address; and a data input/output unit suitable for controlling a memory unit associated with a new local address to store the data in a memory region corresponding to the new local address among the plurality memory units based on the attribute of the data.

In an embodiment, there is provided an operation method of a memory system including a memory pool. The operation method may include: translating a system address into a local address within the memory pool, the system address being received with an access command from a host; dynamically changing a threshold based on a number of accesses to each local address for data within the memory pool; determining an attribute of data associated with the translated local address based on the threshold and the number of accesses to the translated local address; and storing the data in a memory region corresponding to a new local address among the plurality memory units based on the attribute of the data.

In an embodiment, a memory system includes: first and second devices respectively including heterogeneous storage areas; and a controller configured to: count, at each access to a local address indicating a location within the respective storage areas, the local address being translated from an access-requested system address based on map information representing a relationship between system addresses and local addresses indicating locations within the storage areas, a number of accesses to the local address; update, at a predetermined period, a threshold based on the number of accesses to the local addresses within the map information; move hot data from the storage area of the second device to the storage area of the first device and cold data from the storage area of the first device to the storage area of the second device; and change the local addresses within the map information according to the move of the hot data and the cold data, wherein the number of accesses to the local address of the hot data is the threshold or greater, and wherein the number of accesses to the local address of the cold data is less than threshold.

In an embodiment, a memory system includes: first and second devices respectively including heterogeneous storage areas; and a controller configured to: count, at each access to a local address indicating a location within the respective storage areas, the local address being translated from an access-requested system address based on map information representing a relationship between system addresses and local addresses indicating locations within the storage areas, a number of accesses to the local address; update, at a predetermined period, a threshold based on the number of accesses to the local addresses within the map information; store hot data into the storage area of the first device and cold data into the storage area of the second device in response to a write request related to the access-requested system address; and change the local addresses within the map information according to the move of the hot data and the cold data, wherein the number of accesses to the local address of the hot data is the threshold or greater, and wherein the number of accesses to the local address of the cold data is less than threshold.

DETAILED DESCRIPTION

Hereafter, various embodiments will be described in detail with reference to the accompanying drawings. It should be understood that the following descriptions will be focused on portions required for understanding an operation in accordance with an embodiment, and descriptions of the other portions will be ruled out in order not to unnecessarily obscure subject matters of the present disclosure.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

It is noted that reference to "an embodiment," "another embodiment" or the like does not necessarily mean only one embodiment, and different references to any such phrase are not necessarily to the same embodiment(s).

Hereafter, various embodiments will be described in detail with reference to the accompanying drawings.

Figure 1:
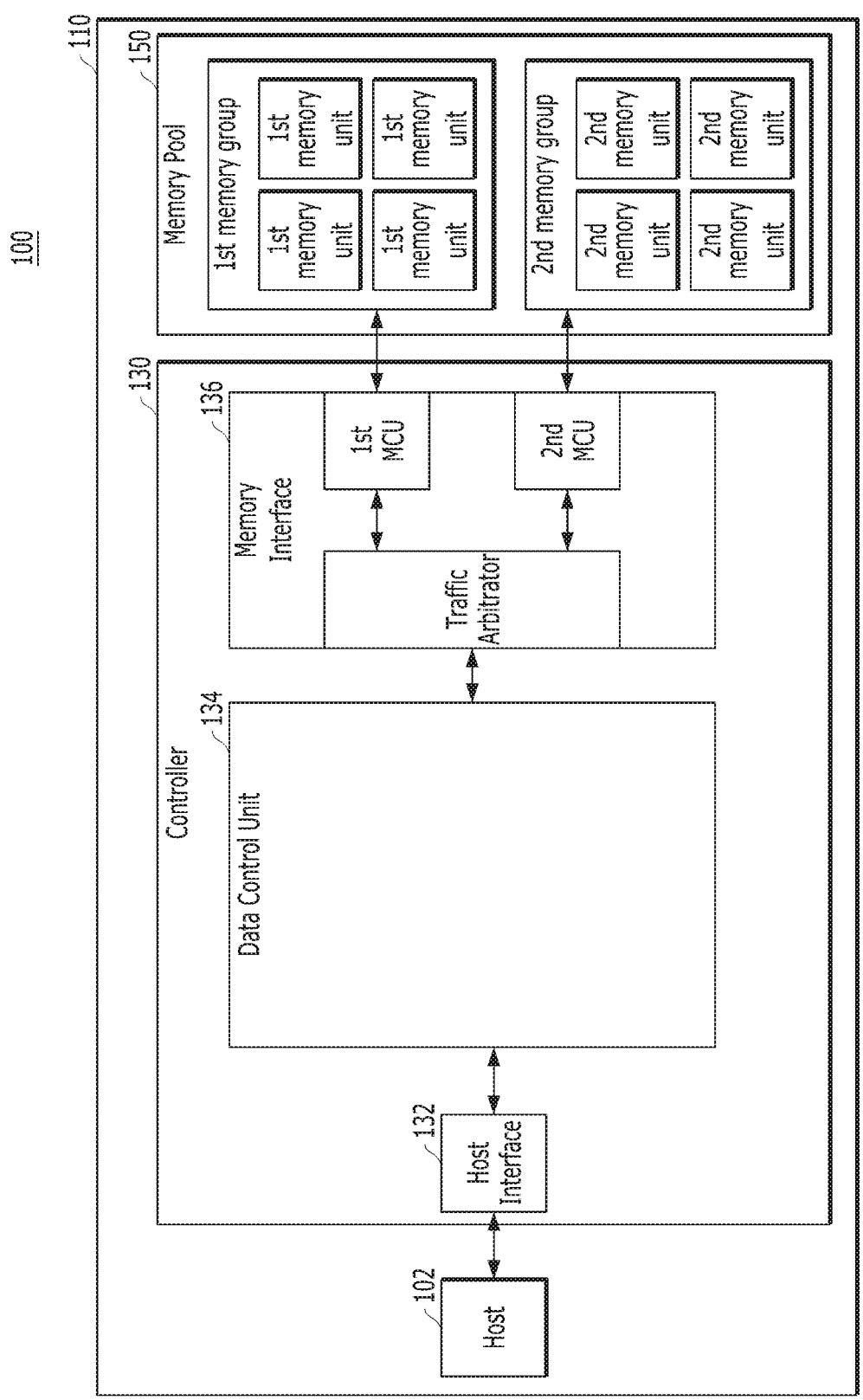
FIG. 1 illustrates the structure of a data processing system including a memory system in accordance with an embodiment.

FIG. 1 illustrates the structure of a data processing system 100 including a memory system 110 in accordance with an embodiment.

Referring to FIG. 1, the data processing system 100 may include the memory system 110 and a host 102.

A server system or data processing system such as an upcoming data center may have a structure in which a plurality of boards such as computer boards and memory boards are mounted in a unit rack so as to be distinguished from each other. The memory system 110 may correspond to the memory board. The host 102 may correspond to the computer board.

Referring to FIG. 1, the memory system 110 may include a memory pool 150 and a controller 130.

The memory pool 150 may include a plurality of memory units. The memory units may store (or write) data and output (or read) stored data, under control of the controller 130.

The memory pool 150 may include a plurality of memory units having different characteristics, in order to satisfy various user workloads. That is, one memory pool 150 may be an integrated memory device in which a plurality of memories such as DRAM, PCRAM, MRAM, STT-RAM and flash memory are converged. Such an integrated memory device may be used for various usage models because the respective memories have different characteristics.

The memory pool 150 may include a 1st memory group and a 2nd memory group. Each of the 1st and 2nd memory groups may include one or more memory units. The memory units may store data therein in response to an external command. It is to be noted that the number of memory groups and memory units shown in FIG. 1 is merely an example and may change depending on design.

In an embodiment, 1st memory units included in the 1st memory group and 2nd memory units included in the 2nd memory group may have different characteristics. For example, the 1st memory units may include memory devices having higher access speed than the 2nd memory units. For example, the 1st memory units may be volatile memory units, and the 2nd memory units may be nonvolatile memory units. Examples of the volatile memory unit may include a DRAM unit such as a dual in-line memory module (DIMM). Examples of the nonvolatile memory unit may include a NAND flash memory unit such as a universal flash storage (UFS) or embedded multi-media card (eMMC).

The 1st memory unit and the 2nd memory unit may have different advantages. The case in which the 1st memory unit is a DRAM unit and the 2nd memory unit is a NAND flash memory unit will be exemplified to describe different advantages of the 1st and 2nd memory units. The 1st memory unit may have higher access speed than the 2nd memory unit, and have a longer lifetime than the 2nd memory unit. Since the 2nd memory unit is a nonvolatile memory that does not need to perform a refresh operation to retain data stored therein, the 2nd memory unit may be operated at low power.

The 2nd memory unit may have lower access speed than the 1st memory unit. In an embodiment, the 2nd memory group may further include a cache memory unit (not illustrated) in order to improve low access speed. The cache memory unit may be a DRAM unit. In an embodiment, the cache memory unit may operate according to a write through method or a write back method.

The controller 130 may control data transmission/reception between the host 102 and the memory units within the memory pool 150.

The controller 130 may include a host interface 132, a data control unit 134 and a memory interface 136.

The data control unit 134 may control overall operations of the memory system 110. For example, the data control unit 134 may control a write operation of storing write data received from the host 102 in a memory unit in response to a write request. For another example, the data control unit 134 may control a read operation of reading data stored in a memory unit and outputting the read data to the host 102, in response to a read request.

The host interface 132 may support interfacing between the host 102 and the data control unit 134. In an embodiment, the host interface 132 may support interfacing between the data control unit 134 and the host 102 through an interconnect board. The interconnect board will be described in detail with reference to FIG. 11.

The host interface 132 may provide data received from the data control unit 134 to the host 102 and provide data received from the host 102 to the data control unit 134, using protocols related to one or more wired/wireless communication techniques. For example, the host interface 132 may support communication between the host 102 and the data control unit 134 according to protocols such as Peripheral Component Interconnect Express (PCIe), QuickPath Interconnect (QPI) and Ethernet. Furthermore, the host interface 132 may support communication between the host 102 and the data control unit 134 according to the interface specifications such as Cache Coherent Interconnect for Accelerators (CCIX) and GEN-Z.

The memory interface 136 may support interfacing between the data control unit 134 and the memory units of the memory pool 150. The memory interface 136 may include a traffic arbitrator, a 1st memory control unit (MCU) and a 2nd MCU.

The 1st MCU may control the 1st memory units included in the 1st memory group. That is, the 1st MCU may support data transmission/reception between the controller 130 and the 1st memory units.

The 2nd MCU may control the 2nd memory units included in the 2nd memory group. That is, the 2nd MCU may support data transmission/reception between the controller 130 and the 2nd memory units.

The traffic arbitrator may arbitrate signal transmission/reception between the data control unit 134 and the 1st and 2nd MCUs. Specifically, the traffic arbitrator may provide a read or write command received from the data control unit 134 to the MCU related to a local address of the memory pool 150.

The controller 130 may control the 1st and 2nd memory units to store data having different attributes, in order to take different advantages of the 1st and 2nd memory units. For example, the controller 130 may control the 1st and 2nd memory units such that hot data which is frequently accessed is stored in the 1st memory unit having high access speed, and cold data which is infrequently accessed is stored in the 2nd memory unit which can be operated at low power.

Figure 2:
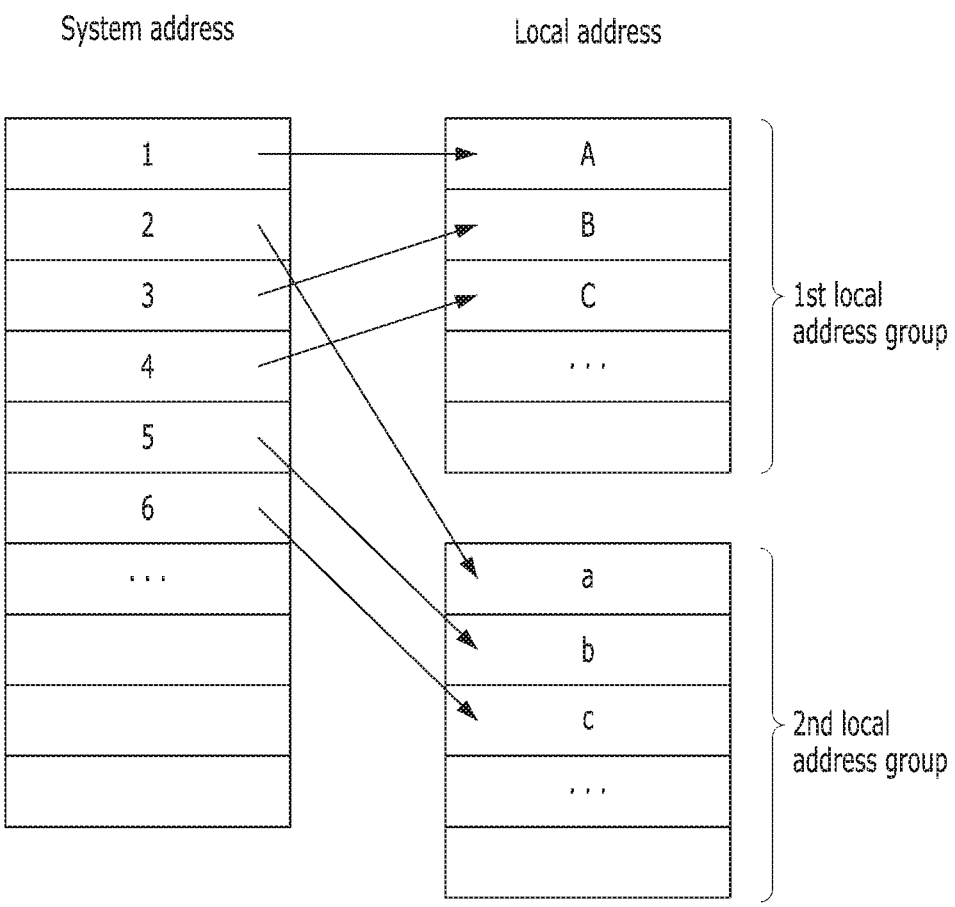
FIG. 2 is a diagram for describing an address mapping operation for sorting and storing data in 1st and 2nd memory units, depending on data attributes.

FIG. 2 is a diagram for describing an address mapping operation for sorting and storing data in the 1st and 2nd memory units, depending on data attributes.

FIG. 2 illustrates system addresses of the host 102, local addresses of the memory pool 150, and mapping relationship between the system addresses and the local addresses.

The system address may indicate an address through which the host 102 accesses the memory system 110. Examples of the system address may include a logical block address (LBA).

The local address may indicate an address through which the controller 130 receiving the system address accesses a memory unit within the memory pool 150. Each of the local addresses may be associated with a predetermined memory unit. Depending on the types of the memory units, the local address may be a physical address or logical address. For example, when the memory unit is a NAND flash memory unit, the local address which is a logical address may be translated into a physical address in the memory unit associated with the local address.

According to an embodiment, the local addresses may be divided into a 1st local address group and a 2nd local address group depending on which memory unit each of the local addresses is associated with. The local addresses belonging to the 1st local address group may be associated with the 1st memory units, and the local addresses belonging to the 2nd local address group may be associated with the 2nd memory units. That is, the local addresses belonging to the 1st local address group may be associated with hot data, and the local addresses belonging to the 2nd local address group may be associated with cold data.

FIG. 2 illustrates that a system address '1' is mapped to a local address 'A'. Since the local address 'A' belongs to the 1st local address group, data associated with the local address 'A' may be hot data. Similarly, when a system address '2' is mapped to a local address 'a', data associated with the local address 'a' may be cold data.

In accordance with an embodiment, the controller 130 may translate a system address into a local address of the memory pool 150, the system address being received with an access command from the host 102. The controller 130 may count a number of accesses to the local addresses of the memory pool 150. The access command may include a read command and a write command.

The controller 130 may dynamically change a threshold based on the numbers of accesses to the respective local addresses. Each number of accesses to the local addresses may be time varying. The threshold may indicate a reference value of the access count for determining the attribute of data associated with the translated local address.

In accordance with an embodiment of the present disclosure, data externally provided or already stored in the memory pool 150 may be determined as one between hot data and cold data. The threshold may be dynamically decided according to the time varying numbers of accesses to the local addressed of the memory pool 150. The data determined as the hot data may be stored in the first memory units or moved from the second memory units into the first memory units. The data determined as the cold data may be stored in the second memory units or moved from the first memory units into the second memory units. According to the storing or moving of the hot data and the cold data, the mapping relationship between the system addresses and the local addresses may be updated.

The controller 130 may determine the attributes of the data associated with the local addresses, based on the threshold and the numbers of accesses to the respective local addresses. According to the determined attributes, the controller 130 may sort and store the data in the memory pool 150. Furthermore, when the attributes of the data associated with the local addresses are changed as the numbers of accesses to the respective local addresses and the threshold are dynamically changed, the controller 130 may move and store the data within the memory pool 150 according to the changed attributes.

In accordance with an embodiment, the controller 130 may sort and store hot data and cold data in the memory pool 150 according to the threshold and the numbers of accesses to the respective local addresses. Therefore, the advantages of the 1st memory unit and the 2nd memory unit within the memory system 110 may be utilized as much as possible.

Figure 3:
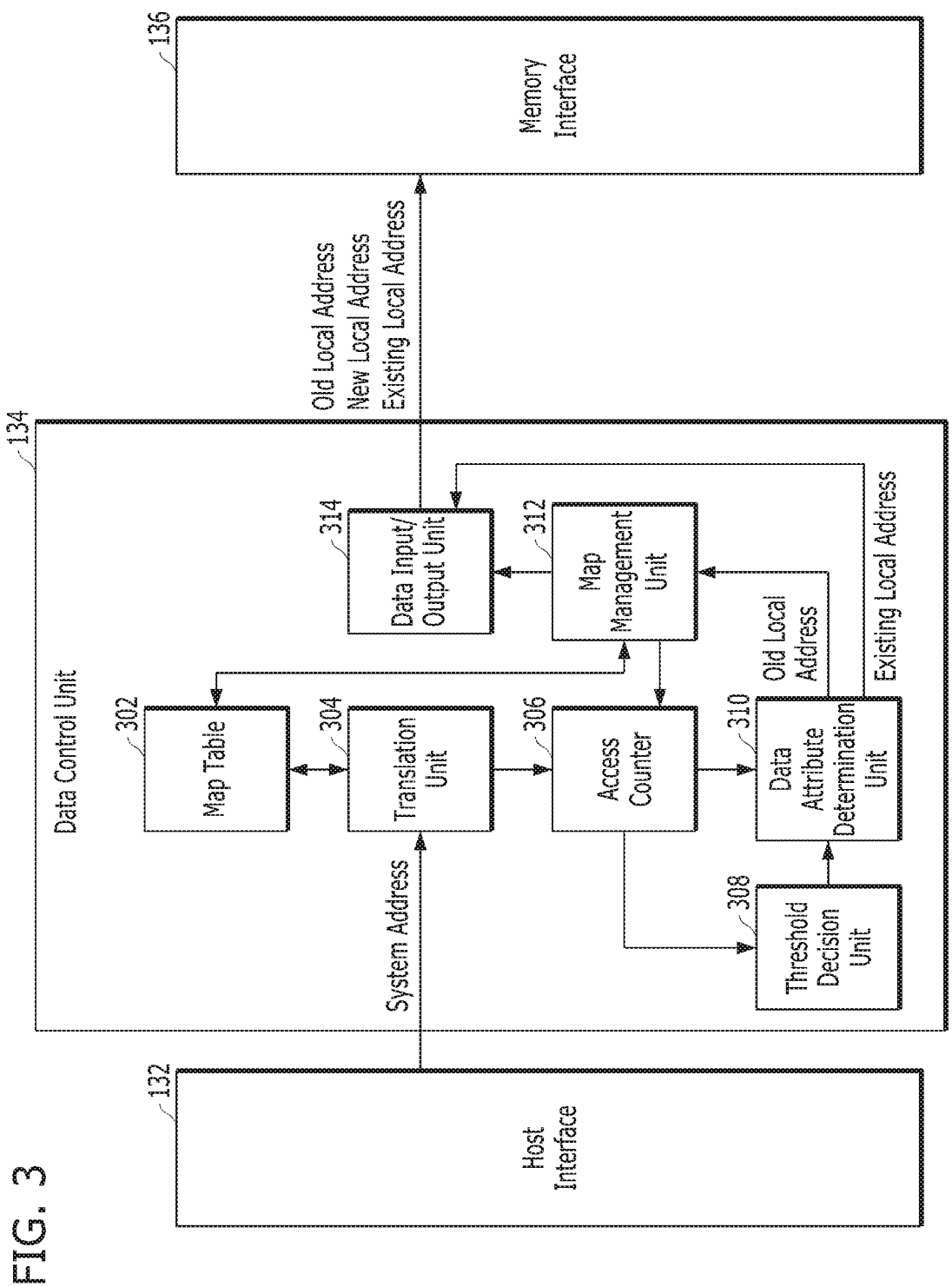
FIG. 3 schematically illustrates a structure of a data control unit in accordance with an embodiment.

FIG. 3 schematically illustrates the structure of the data control unit 134 in accordance with an embodiment. The data control unit 134 may include a map table 302, a translation unit 304, an access counter 306, a threshold decision unit 308, a data attribute determination unit 310, a map management unit 312 and a data input/output unit 314.

The translation unit 304, threshold decision unit 308, data attribute determination unit 310, map management unit 312 and data input/output unit 314 include all circuits, systems, software, firmware and devices necessary for their respective operations and functions.

The map table 302 may store a mapping relationship between system addresses and local addresses.

The translation unit 304 may translate a system address into a local address by referring to the map table 302, the system address being received with a read or write command from the host 102. When the received system address is not yet mapped to a local address, the translation unit 304 may map the received system address to a new local address.

The access counter 306 may count the number of accesses to each of the local addresses. For example, the access counter 306 may count the number of accesses to the local address translated in response to the read or write command, among the numbers of accesses to the respective local addresses, which are stored in a memory (not illustrated) within the controller 130. In an embodiment, the access counter 306 may reset the numbers of accesses to all the local addresses in a cycle that may be predetermined and resume the access counting operation, in order to reflect the recent access tendency.

The threshold decision unit 308 may dynamically change the threshold based on the time varying numbers of accesses to the respective local addresses. An example of the operation in which the threshold decision unit 308 dynamically changes the threshold will be described with reference to FIG. 6.

The data attribute determination unit 310 may determine the attributes of the data associated with the respective local addresses, based on the dynamically decided threshold. If the attribute of data associated with a local address is changed, data attribute determination unit 310 may provide the map management unit 312 with the old local address to change to new local address. On the other hand, if the attribute of data associated with the local address is not changed, data attribute determination unit 310 may provide the data input/output unit 314 with the existing local address to access corresponding memory region.

In an embodiment, whenever a local address is accessed, the data attribute determination unit 310 may determine the attribute of data associated with the corresponding local address. In an embodiment, the data attribute determination unit 310 may periodically determine the attributes of all of the data stored in the memory pool 150 for the respective local addresses. An example of the operation in which the data attribute determination unit periodically determines the attributes of all of the data for the respective local addresses will be described with reference to FIG. 8.

The map management unit 312 may change the mapping relationship between the system addresses and the local addresses according to a predetermined condition. In an embodiment, the predetermined condition may include whether the data attribute is determined to be changed. The map management unit 312 may determine whether the data attribute is changed, based on the data attribute determined by the data attribute determination unit 310. When the data attribute is changed, the map management unit 312 may change the mapping relationship between the system addresses and the local addresses.

The map management unit 312 may change the mapping relationship between the system addresses and the local addresses by mapping the system address associated with the corresponding data to a new local address to store the data in another memory unit of the memory pool 150.

Figure 4:
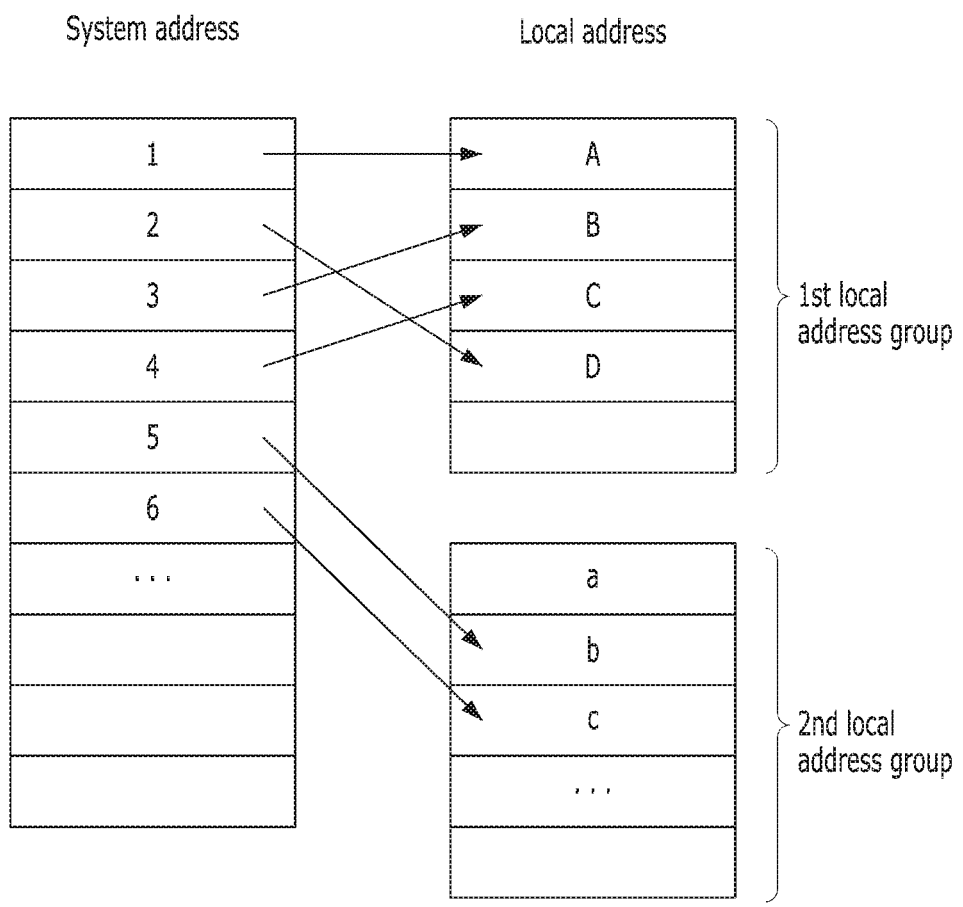
FIG. 4 is a diagram for describing an operation of mapping a system address to a new local address.

FIG. 4 is a diagram for describing the operation of mapping a system address to a new local address.

FIG. 4 illustrates system addresses, local addresses, and a mapping relationship between the local addresses and the system addresses, similar to FIG. 2.

Referring back to FIG. 2, when a system address '2' is mapped to a local address 'a', data associated with the system address '2' may be cold data. When the number of accesses to the local address 'a' is increased because a read or write command for the system address '2' was received from the host 102, the attribute of the data may be determined as hot data. Since the data associated with the local address 'a' included in the 2nd local address group was determined as hot data, the map management unit 312 may determine that the attribute of the data is changed.

Referring to FIG. 4, the map management unit 312 may map the system address '2' to a new local address 'D' belonging to the 1st local address group, such that the data is stored in the 1st memory unit. The map management unit 312 may reflect the mapping relationship between the system address and the new local address into the map table 302.

In an embodiment, the predetermined condition may include not only whether the data attribute is determined to be changed, but also whether a predetermined time has elapsed since the access counter 306 started the access count operation. That is because the numbers of accesses to the respective local addresses may not be collected enough to determine the attributes of the data stored in the memory pool 150 at the initial stage of the access count operation by the access counter 306.

Referring back to FIG. 3, the data input/output unit 314 may provide a command to the memory interface 136 such that a memory unit associated with a new local address is controlled to store the data according to the mapping relationship between the system address and the new local address. In an embodiment, the data input/output unit 314 may read data stored in a memory region corresponding to an old local address before the mapping relationship between the system addresses and the local addresses is changed, and write the read data to a memory region corresponding to a new local address.

Hereafter, referring to FIGS. 5 to 8, a write operation, a read operation and a data attribute update operation of the memory system 110 in accordance with an embodiment will be described.

Figure 5:
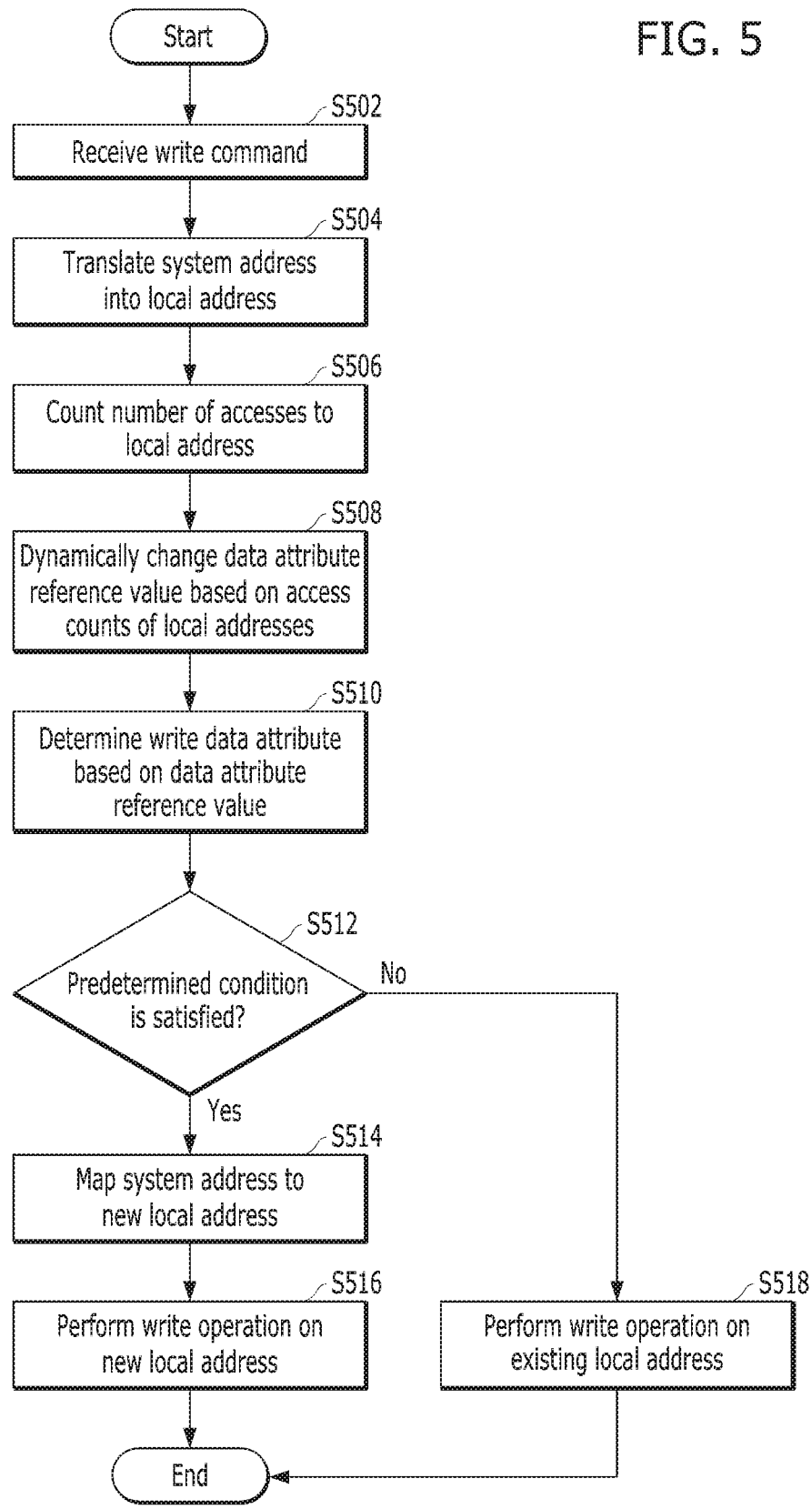
FIGS. 5 and 6 are flowcharts illustrating a write operation of the memory system in accordance with an embodiment.
Figure 6:
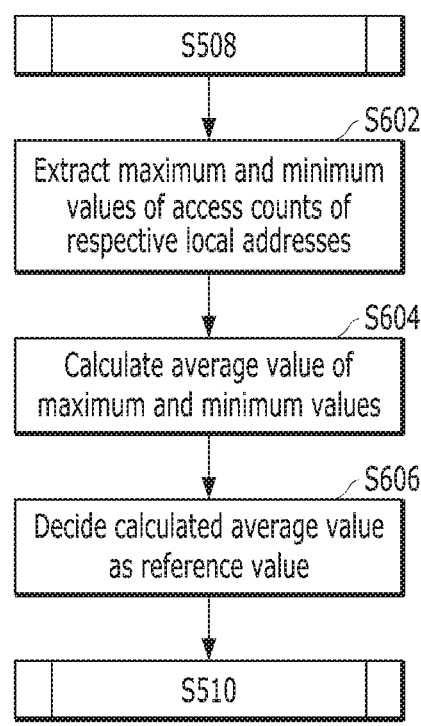

FIGS. 5 and 6 are flowcharts illustrating the write operation of the memory system 110 in accordance with an embodiment.

Referring to FIG. 5, the host interface 132 may receive a write command, write data and a 1st system address from the host 102, the 1st system address indicating an address where the write operation is to be performed, at step S502. The host interface 132 may provide the 1st system address to the translation unit 304. The host interface 132 may queue the write command in a command queue (not illustrated) within the data control unit 134, and buffer the write data and the 1st system address in a buffer (not illustrated) within the data control unit 134.

At step S504, the translation unit 304 may translate the 1st system address received from the host interface 132 into a 1st local address by referring to the map table 302.

When the memory pool 150 stores data associated with the 1st system address for the first time, mapping information of the 1st system address may not be stored in the map table 302. In an embodiment, when the 1st system address is not yet mapped to a local address in the map table 302, the translation unit 304 may map the 1st system address to a new local address, and start counting accesses to the new local address at step S506 which will be described below. Since the number of accesses to data which is stored for the first time is '0', the translation unit 304 may consider the data as cold data, and map the 1st system address to a new local address included in the 2nd local address group. When the memory pool 150 stores the data associated with the 1st system address for the first time, the 1st local address may correspond to the new local address.

The translation unit 304 may provide the 1st local address to the access counter 306.

At step S506, the access counter 306 may update the number of accesses to the 1st local address.

The access counter 306 may provide the threshold decision unit 308 with the numbers of accesses to the respective local addresses for all data stored in the memory pool 150. The access counter 306 may provide the data attribute determination unit 310 with the 1st local address and the number of accesses to the 1st local address.

At step S508, the threshold decision unit 308 may dynamically decide the threshold based on the numbers of accesses to the respective local addresses.

FIG. 6 is a flowchart illustrating in more detail operations of step S508.

In an embodiment, step S508 may include steps S602 to S606.

At step S602, the threshold decision unit 308 may extract the maximum and minimum values of the numbers of accesses to the respective local addresses for a recent predetermined time, which are received from the access counter 306.

At step S604, the threshold decision unit 308 may calculate the average value of the maximum and minimum values.

At step S606, the threshold decision unit 308 may decide the calculated average value as the threshold.

The threshold decision unit 308 may not necessarily calculate the average value at step S604. In an embodiment, the threshold decision unit 308 may calculate another value between the maximum value and the minimum value according to a predetermined condition, and decide the calculated value as the threshold at step S606. Furthermore, the threshold decision unit 308 may not necessarily extract only the maximum and minimum values at step S602. The threshold decision unit 308 may extract a plurality of values which can represent the numbers of accesses to the respective local addresses according to a predetermined condition.

In an embodiment, the upper limit of the threshold may be decided in advance. The lifetimes of the memory devices within the memory units may be limited depending on the numbers of accesses to the respective local addresses. For example, the erase/write (EW) cycle of a multi-level-cell NAND flash memory device may be limited to approximately 10,000 times.

When the 2nd memory unit is a memory unit having a limited lifetime, the memory devices within the 2nd memory unit may quickly deteriorate in the case that a number of accesses to data stored in the memory devices is a predetermined access number or greater. Therefore, the upper limit of the threshold may be decided in advance, such that a number of accesses to data stored in the memory unit having a limited lifetime is controlled as under the threshold access number. In an embodiment, the upper limit of the threshold may be decided based on the EW cycle. The threshold decision unit 308 may decide the smaller value between the upper limit of the threshold and the value calculated based on the numbers of accesses to the respective local addresses at step S604 as the threshold.

Referring back to FIG. 5, the data attribute determination unit 310 may determine the attribute of the write data based on the threshold at step S510.

Specifically, the data attribute determination unit 310 may receive the 1st local address and the number of accesses to the 1st local address from the access counter 306, and receive the threshold from the threshold decision unit 308.

The data attribute determination unit 310 may include a comparator (not illustrated). The comparator may determine the attribute of the write data associated with the 1st local address, depending on whether or not the number of accesses to the 1st local address is equal to or more than the threshold. For example, when the number of accesses to the 1st local address is equal to or more than the threshold, the write data may be determined as hot data. On the other hand, when the number of accesses to the 1st local address is less than the threshold, the write data may be determined as cold data.

At step S512, the data attribute determination unit 310 may determine whether a predetermined condition for changing addressing mapping is satisfied. As described with reference to FIG. 3, the predetermined condition may include not only whether the attribute of the write data is determined to be changed, but also whether a predetermined time has elapsed since the access counter 306 started the access count operation.

When the predetermined condition is satisfied ("Yes" at step S512), the data attribute determination unit 310 may provide the map management unit 312 with the 1st local address and the attribute of the data associated with the 1st local address. The data control unit 134 may perform operations of steps S514 to S516 which will be described below.

When the predetermined condition is not satisfied ("No" at step S512), the data attribute determination unit 310 may provide the 1st local address to the memory interface 136. The memory interface 136 may perform the operation of step S518 which will be described below.

At step S514, the map management unit 312 may map the 1st system address to a new 1st local address.

The map management unit 312 may provide the new 1st local address to the data input/output unit 314. The map management unit 312 may update the mapping relationship between the 1st system address and the new 1st local address into the map table 302. The map management unit 312 may control the access counter 306 to change the number of accesses to the new 1st local address to the number of accesses to the old 1st local address, and to reset the number of accesses to the old 1st local address.

At step S516, the data input/output unit 314 may provide the memory interface 136 with the new 1st local address, a write command and write data. The write command may be the write command queued in the command queue (not illustrated) at step S502, and the write data may be the write data buffered in the buffer (not illustrated) at step S502. The memory interface 136 may control a memory unit associated with the new 1st local address to perform a write operation in response to the write command received from the data input/output unit 314.

Since the mapping between the 1st system address and the old 1st local address is removed, the old 1st local address may not be accessed even though the 1st system address is received again with an access command from the host 102.

The old 1st local address may be mapped to another system address by the translation unit 304 or the map management unit 312 later.

At step S518, the data input/output unit 314 may provide a write command to the memory interface 136 to write the write data received from the host 102 to the existing 1st local address that is translated from the 1st system address at step S504. The write command may be the write command queued in the command queue (not illustrated) at step S502, and the write data may be the write data buffered in the buffer (not illustrated) at step S502. The memory interface 136 may control the memory unit associated with the existing 1st local address to perform a write operation in response to the write command received from the data input/output unit 314.

According to the write operation of the memory system 110 described with reference to FIGS. 5 and 6, the write data may be sorted and stored in the memory pool according to the attribute of the write data, which is determined based on the number of accesses to the respective local addresses and the dynamically changed threshold.

Figure 7:
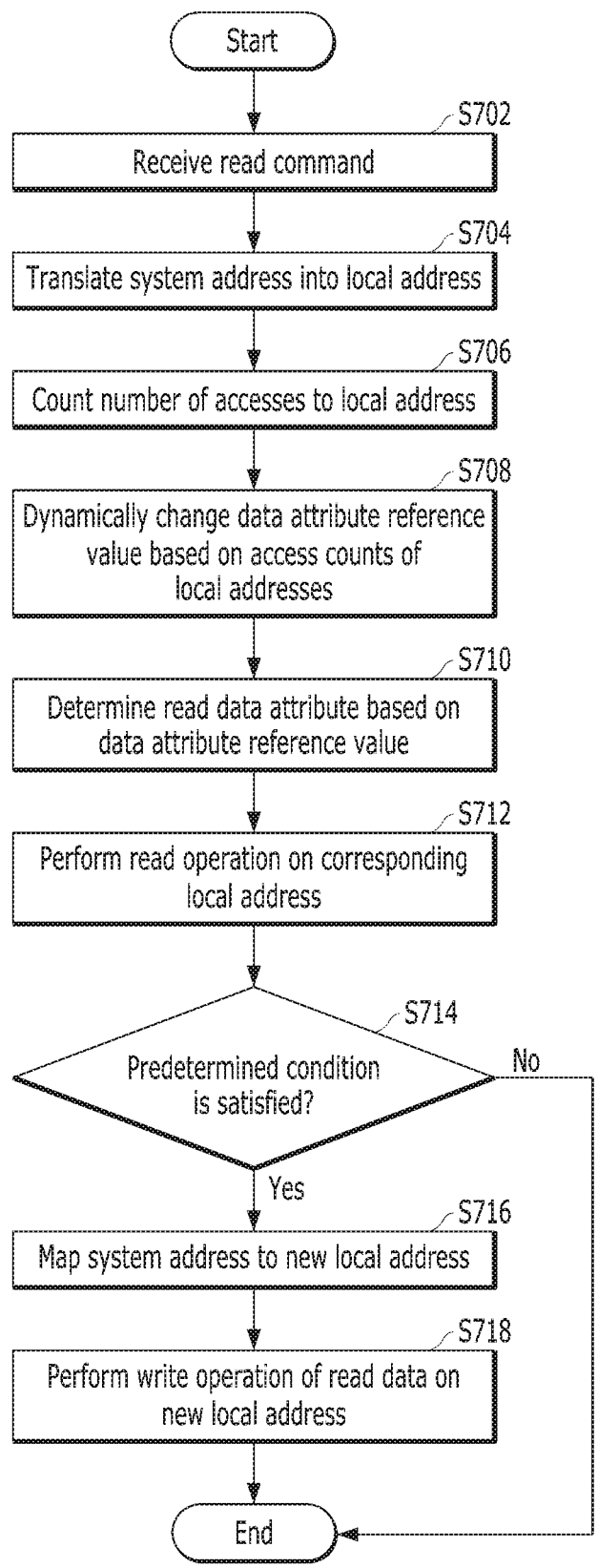
FIG. 7 is a flowchart illustrating a read operation of the memory system in accordance with an embodiment.

FIG. 7 is a flowchart illustrating the read operation of the memory system 110 in accordance with an embodiment.

At step S702, the host interface 132 may receive a read command and a 1st system address from the host 102, the 1st system address indicating an address where the read operation is to be performed. The host interface 132 may queue the read command in the command queue (not illustrated) within the data control unit 134, and buffer the 1st system address in the buffer (not illustrated) within the data control unit 134.

At step S704, the translation unit 304 may translate the 1st system address received from the host interface 132 into a 1st local address by referring to the map table 302. The translation unit 304 may provide the 1st local address to the access counter 306.

At step S706, the access counter 306 may update the number of accesses to the 1st local address. The detailed operation of step S706 may be performed in the same manner as described with reference to step S506.

At step S708, the threshold decision unit 308 may change the threshold based on the numbers of accesses to the respective local addresses. The specific operation of step S708 may be performed in the same manner as described with reference to step S508.

At step S710, the data attribute determination unit 310 may determine the attribute of read data based on the threshold. The detailed operation of step S710 may be performed in the same manner as described with reference to step S510.

At step S712, the data input/output unit 314 may provide the read command to the memory interface 136 such that a memory unit associated with the 1st local address performs a read operation. The read command may be the read command queued in the command queue (not illustrated) at step S702. The memory interface 136 may buffer the read data read from the memory unit into the buffer (not illustrated). The data input/output unit 314 may provide the buffered read data to the host 102 through the host interface 132.

In accordance with an embodiment, the number of accesses to the respective local addresses and the threshold may be time varying. Therefore, the attributes of the data stored in the memory pool 150 may be changed with time. For example, although certain data was determined as cold data and stored in the 2nd memory unit, the corresponding data may be determined as hot data when the data is read. At following steps S714 to S718, when the data attribute of the read data is changed, the map management unit 312 may change mapping relationship between the system addresses and the local addresses to store the corresponding data in another memory unit.

At step S714, the data attribute determination unit 310 may determine whether a predetermined condition for changing addressing mapping was satisfied. As described with reference to FIG. 3, the predetermined condition may include not only whether the attribute of the read data is determined to be changed, but also whether a predetermined time has elapsed since the access counter 306 started the access count operation.

When the predetermined condition is satisfied ("Yes" at step S714), the data attribute determination unit 310 may provide the map management unit 312 with the 1st local address and the attribute of data associated with the 1st local address. The data control unit 134 may perform operations of steps S716 to S718 which will be described below.

When the predetermined condition is not satisfied ("No" at step S714), the data control unit 134 may end the operation.

At step S716, the map management unit 312 may map the 1st system address to a new 1st local address. The detailed operation of step S716 may be performed in the same manner as described with reference to step S514.

At step S718, the data input/output unit 314 may provide the memory interface 136 with the new 1st local address, a write command and the read data. The write command may indicate a command which is applied to move and store the data associated with the 1st system address into the new 1st local address. The read data may indicate the data which is read at step S712 and buffered in the buffer (not illustrated). The memory interface 136 may control a memory unit associated with the new 1st local address to perform a write operation in response to the write command received from the data input/output unit 314.

According to the read operation of the memory system 110 described with reference to FIG. 7, the read data may be sorted and stored in the memory pool according to the attribute of the read data, which is determined based on the numbers of accesses to the respective local addresses and the dynamically changed threshold.

As described above, the attributes of the data stored in the memory pool 150 may be changed with time. In accordance with an embodiment, the data control unit 134 may perform a data attribute update operation of periodically updating the attributes of all data stored in the memory pool 150 for the respective local addresses, and controlling the memory units within the memory pool 150 to sort and store the data according to the updated attributes.

Figure 8:
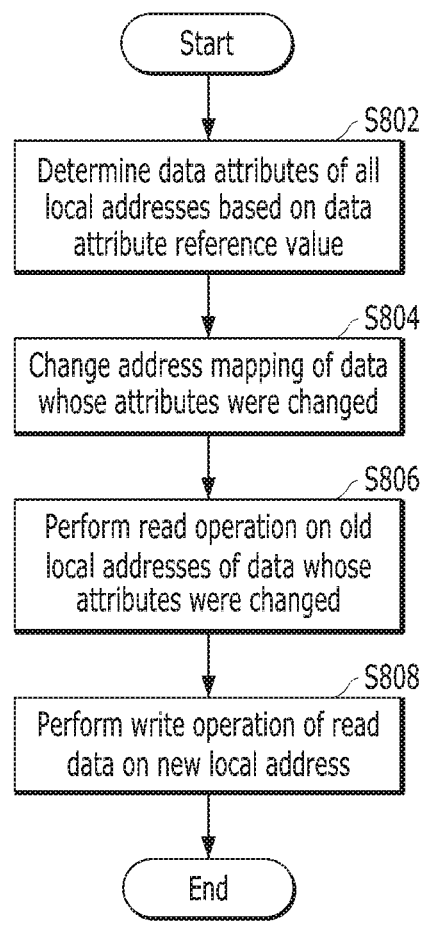
FIG. 8 is a flowchart illustrating a data attribute update operation of the memory system in accordance with an embodiment.

FIG. 8 is a flowchart illustrating the data attribute update operation of the memory system 110 in accordance with an embodiment.

The data attribute update operation of steps S802 to S808 which will be described below may be performed in a predetermined cycle.

As described with reference to FIG. 3, the access counter 306 may reset the numbers of accesses to all local addresses in a predetermined cycle, and resume the access counting operation. In an embodiment, the data attribute update operation may be performed in the same cycle as the operation of resetting the numbers of accesses to the respective local addresses. For example, the data attribute update operation may be performed immediately before the numbers of accesses to the respective local addresses are reset.

At step S802, the data attribute determination unit 310 may determine the attributes of all data stored in the memory system 110 for the respective local addresses, based on the threshold. Specifically, the comparator (not illustrated) within the data attribute determination unit 310 may compare the dynamically changed threshold to the numbers of accesses to the respective local addresses for all data stored in the memory pool 150, and determine the attributes of all of the data for the respective local addresses. Based on the determination result, the data attribute determination unit 310 may determine whether the attributes of the data stored in the memory pool 150 are changed, for the respective local addresses. The data attribute determination unit 310 may provide the map management unit 312 with the local addresses associated with the data of which the attributes are changed.

At step S804, the map management unit 312 may change the mapping relationship between the system addresses and the local addresses such that the data of which the attributes are changed are moved and stored into another memory unit of the memory pool 150.

Specifically, the map management unit 312 may map system addresses, associated with the data of which the attributes are changed, to new local addresses by referring to the map table 302 and the local addresses received from the data attribute determination unit 310. The map management unit 312 may reflect the mapping relationship between the system addresses and the new local addresses into the map table 302. The map management unit 312 may control the access counter 306 to change the number of accesses to the new local addresses to the number of accesses to the old local addresses.

The map management unit 312 may provide the data input/output unit 314 with the local addresses received from the data attribute determination unit 310, i.e. the old local addresses, and the new local addresses.

At step S806, the data input/output unit 314 may provide the old local addresses to the memory interface 136. The memory interface 136 may control read operations of the memory units associated with the old local addresses in response to the read command, and buffer read data read through the read operations in the buffer (not illustrated) within the data control unit 134.

At step S808, the data input/output unit 314 may provide the memory interface 136 with a write command, the new local addresses and the buffered read data. The memory interface 136 may control write operations of memory units associated with the new local addresses in response to the write command.

According to the data attribute update operation of the memory system 110 which has been described with reference to FIG. 8, the data stored in the memory pool 150 may be sorted and stored according to the attributes of the data stored in the memory pool 150, which are determined based on the number of accesses to the respective addresses and the dynamically changed threshold. In particular, when certain data is stored in the 1st memory unit without being accessed for a long time even though the data was determined as hot data and thus stored in the 1st memory unit, the data control unit 134 may move and store the corresponding data into the 2nd memory unit.

The memory system 110 described with reference to FIGS. 1 to 8 may be mounted as a memory board in a rack, and configure a server system or data processing system such as a data center. The data processing system including the memory system 110 in accordance with an embodiment will be described with reference to FIGS. 9 to 12.

Figure 9:
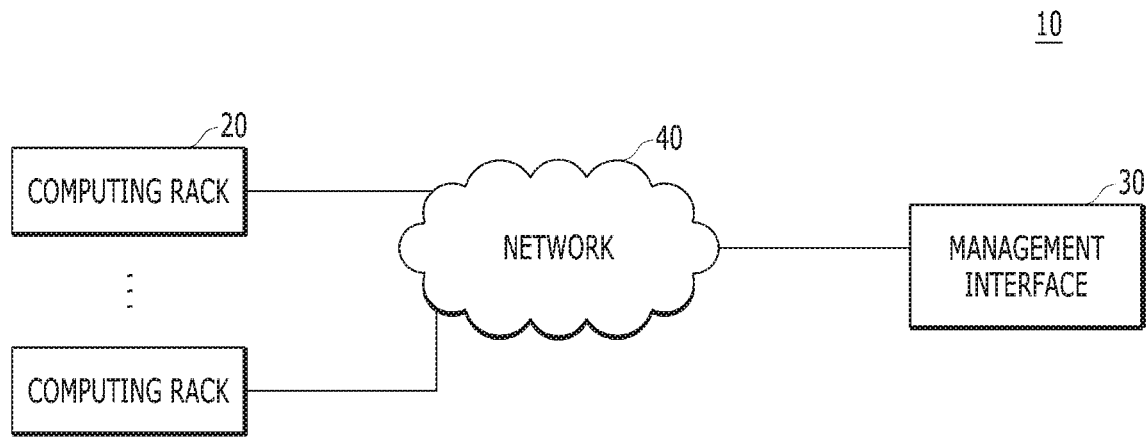
FIGS. 9 to 12 illustrate structures of data processing systems including the memory system in accordance with an embodiment.

FIG. 9 is a block diagram illustrating a data processing system 10. Referring to FIG. 9, the data processing system 10 may include a plurality of computing racks 20, a management interface 30, and a network 40 for communication between the computing racks 20 and the management interface 30. The data processing system 10 having this rack scale architecture may be used by a data center for processing large-scale data.

Each of the computing racks 20 may individually implement one computing device. Alternatively, each of the computing racks 20 may be combined with one or more other computing racks to implement one computing device. Example structures and operations of the computing racks 20 are described below.

The management interface 30 may provide an interactive interface for a user to control, administrate, or manage the data processing system 10. The management interface 30 may be implemented as any type of a computing device that includes any of a computer, a multi-processor system, a server, a rack-mount server, a board server, a lap-top computer, a notebook computer, a tablet computer, a wearable computing device, a network device, a web device, a distributed computing system, a processor-based system, a consumer electronic device, and the like.

In some embodiments of the present disclosure, the management interface 30 may be implemented as a distributed system having operation functions which may be performed by the computing racks 20 or having user interface functions which may be performed by the management interface 30. In other embodiments of the present disclosure, the management interface 30 may be implemented as a virtual cloud server that includes multi-computing devices distributed through the network 40. The management interface 30 may include a processor, an input/output subsystem, a memory, a data storage device, a communication circuit, and the like.

The network 40 may provide and/or receive data between the computing racks 20 and the management interface 30 and/or among the computing racks 20. The network 40 may be implemented with an appropriate number of various wired and/or wireless networks. For example, the network 40 may include a publicly accessible global network, such as a wired or wireless local area network (LAN), a wide area network (WAN), a cellular network, and/or the Internet. In addition, the network 40 may include an appropriate number of auxiliary network devices, such as auxiliary computers, routers, switches, and the like.

Figure 10:
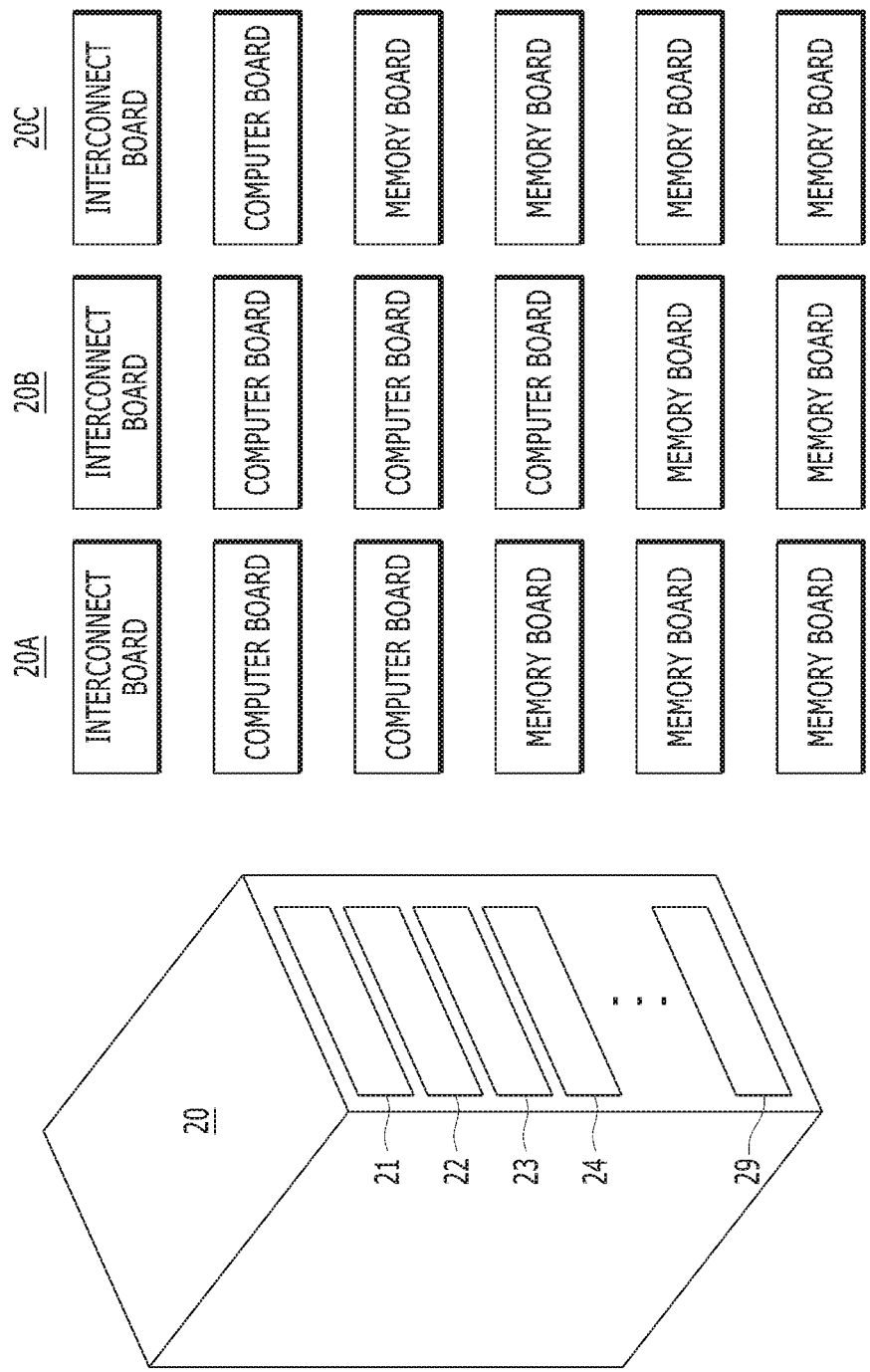

FIG. 10 illustrates an architecture of a computing rack in accordance with an embodiment of the present disclosure.

Referring to FIG. 10, the computing rack 20 may include constituent elements in various forms and structures. For example, the computing rack 20 may include a plurality of drawers 21 to 29. Each of the drawers 21 to 29 may include a plurality of modules, each of the modules may include a plurality of boards.

In various embodiments of the present disclosure, the computing rack 20 may be implemented by a combination of appropriate numbers of computer boards, memory boards, and/or interconnect boards. The computing rack 20 is described as a combination of boards, but the computing rack 20 may also be implemented by other elements such as drawers, modules, trays, boards, sashes, or other suitable units. The computing rack 20 may have a structure in which its constituent elements are disaggregated and classified according to their functions. The computing rack 20 may have a structure of an interconnect board, a computer board, and a memory board with a classification order from the top down, although the computing rack 20 is not limited to such structure. The computing rack 20 and a computing device including the computing rack 20 may be referred to as 'a rack-scale system' or 'a disaggregated system'.

In an embodiment of the present disclosure, a computing device may be implemented as one computing rack 20. In other embodiments, the computing device may be implemented by all or some constituent elements of two or more computing racks 20, or some constituent elements of one computing rack 20.

In various embodiments of the present disclosure, a computing device may be implemented by a combination of appropriate numbers of computer boards, memory boards, and interconnect boards that are included in the computing rack 20. As illustrated in FIG. 10, a computing rack 20A may include two computer boards, three memory boards, and one interconnect board. In other examples, a computing rack 20B may include three computer boards, two memory boards, and one interconnect board. In other examples, a computing rack 20C may include one computer board, four memory boards, and one interconnect board.

Although FIG. 10 illustrates examples in which the computing rack 20 includes appropriate numbers of computer boards, memory boards, and interconnect boards, the computing rack 20 may include additional constituent elements that may be included in typical servers, such as a power system, a cooling system, an input/output device, and so on.

Figure 11:
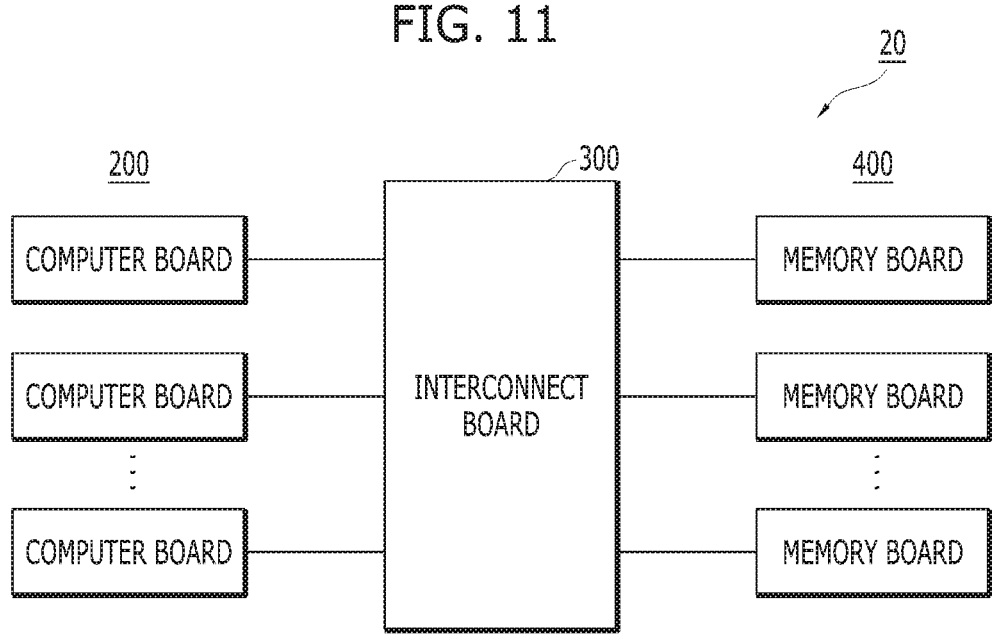

FIG. 11 illustrates a computing device 100 in accordance with an embodiment of the present disclosure.

Referring to FIG. 11, the computing device 100 may include a plurality of computer boards 200, a plurality of memory boards 400, and an interconnect board 300. The computer boards 200 may be pooled computer boards or pooled computer systems. The memory boards may be pooled memory boards or pooled memory systems. The computing device 100 is described as a combination of a plurality of boards, but the computing device 100 may also be implemented by elements such as drawers, modules, trays, boards, sashes, or other suitable units.

Each of the computer boards 200 may include processing elements such as one or more processors, processing/control circuits and central processing units (CPUs). The host 102 described with reference to FIG. 1 may correspond to the compute board 200.

Each of the memory boards 400 may include various types of memories such as a plurality of volatile memories and/or nonvolatile memories. For example, each of the memory boards 400 may include a plurality of dynamic random access memories (DRAMs), flash memories, memory cards, hard disk drives (HDDs), solid state drives (SSDs) and/or combinations thereof.

The memory system 110 described with reference to FIGS. to 8 may correspond to each of the memory boards 400. Each of the memory boards 400 may include a controller that dynamically changes the threshold based on the time varying number of accesses to each of the local addresses, and changes a mapping relationship between the system addresses and the local addresses to sort and store data according to the attributes of the data which are determined based on the threshold.

Each of the memory boards 400 may be divided, allocated, or designated by and used by one or more processing elements that are included in each of the computer boards 200. Also, each of the memory boards 400 may store one or more operating systems (OS) that may be initialized and/or executed by the computer boards 200.

The interconnect board 300 may include a communication circuit, a communication device, or a combination thereof, which may be divided, allocated, or designated by and used by one or more processing elements included in each of the computer boards 200. For example, the interconnect board 300 may be implemented by any suitable number of network interface ports, interface cards, or interface switches. The interconnect board 300 may use protocols related to one or more wired communication technologies for communication. For example, the interconnect board 300 may support communication between the computer boards 200 and the memory boards 400 based on one or more of protocols such as peripheral component interconnect express (PCIe), QuickPath interconnect (QPI), Ethernet, and the like.

Figure 12:
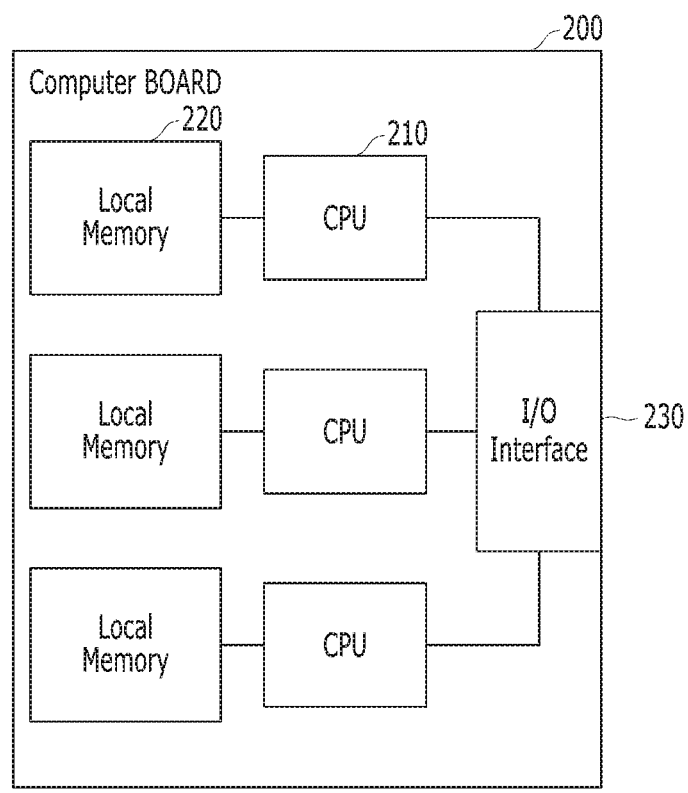

FIG. 12 is a block diagram illustrating a computer board 200 in accordance with an embodiment of the present disclosure.

Referring to FIG. 12, the computer board 200 may include one or more central processing units (CPUs) 210, one or more local memories 220, and an input/output (I/O) interface 230.

The CPUs 210 may divide, allocate, or designate one or more memory boards to be used, among the memory boards 400 illustrated in FIG. 11. Also, the CPUs 210 may initialize the one or more memory boards, and perform a data read operation and/or a data write (i.e., program) operation on the one or more memory boards.

The local memories 220 may store data to perform an operation of the CPUs 210. In various embodiments of the present disclosure, the local memories 220 may have a one-to-one correspondence with the CPUs 210.

The input/output interface 230 may support interfacing between the CPUs 210 and the memory boards 400 through the interconnect board 300 of FIG. 11. The input/output interface 230 may use protocols related to one or more wired communication technologies, output and provide data from the CPUs 210 to the interconnect board 300, and receive data inputted from the interconnect board 300 to the CPUs 210. For example, the input/output interface 230 may support communication between the CPUs 210 and the interconnect board 300 using one or more of protocols such as peripheral component interconnect express (PCIe), QuickPath interconnect (QPI), Ethernet and the like.

In accordance with various embodiments, it is possible to provide a memory system which determines data attributes according to numbers of accesses to local addresses, respectively, and sorts and stores data having different attributes in a memory pool.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
    a memory pool comprising a plurality of memory units; and
    a controller suitable for controlling the plurality of memory units,
    wherein the controller includes:
    a translation unit suitable for translating a first system address into a first local address for first data within the memory pool, the first system address being received with an access command from a host;
    a threshold decision unit suitable for dynamically changing a threshold based on a number of accesses to the first local address;

a data attribute determination unit suitable for determining an attribute of the first data based on the threshold and the number of accesses to the first local address;

a data input/output unit suitable for controlling a memory unit to move the first data from the first local address to a second local address based on the attribute;

an address mapping unit suitable for mapping the first system address to the second local address, changing a number of access to the second local address to the number of accesses to the first local address and resetting the number of accesses to the first local address; and an access counter suitable for resetting numbers of accesses to respective local addresses in a period, wherein the data attribute determination unit further determines attributes of data for the respective local addresses in the period, and wherein the threshold decision unit changes, in a predetermined cycle, the threshold based on maximum and minimum values of the number of accesses to respective local addresses for the first data within the memory pool.

2. The memory system of claim 1, wherein each of the memory units is any one of a first memory unit and a second memory unit, and wherein the data input/output unit controls the memory unit to move the first data to any one of the first and second memory units, depending on whether or not the number of accesses to the first local address is equal to or more than the threshold.

3. The memory system of claim 2, wherein the threshold decision unit changes, in the predetermined cycle, the threshold to an average value of the maximum and minimum values of the number of accesses to respective local addresses for the first data within the memory pool.

4. The memory system of claim 2, wherein the threshold decision unit changes, in the predetermined cycle, the threshold to a smaller of a predetermined upper limit value and an average value of the maximum and minimum values of the number of accesses to respective local addresses for the first data within the memory pool.

5. The memory system of claim 2, wherein the access command is a read command, and wherein the data input/output unit controls, when the attribute of the first data is determined to be changed by the data attribute determination unit, the memory unit to move the first data read from the first local address to the second local address.

6. The memory system of claim 2, wherein the access command is a write command, and wherein the data input/output unit controls, when the attribute of the first data is determined to be changed by the data attribute determination unit, the memory unit to store write data received from the host in the second local address.

7. The memory system of claim 2, wherein the data input/output unit further acquires the first data, the attribute of which is determined to be changed by the data attribute determination unit among all data within the memory pool, from a memory region corresponding to the first local address, and controls the memory unit to move the acquired data from the first local address to the second local address.

8. The memory system of claim 2, wherein the first memory unit is a DRAM unit, and wherein the second memory unit is a NAND flash memory unit.

9. The memory system of claim 1, wherein the access counter resets the numbers of accesses to the respective local address immediately after the data attribute determination unit determines the attributes of data for the respective local address in the period.

10. An operation method of a memory system including a memory pool, the operation method comprising:

translating a first system address into a first local address for first data within the memory pool, the first system address being received with an access command from a host;

dynamically changing a threshold based on a number of accesses to the first local address;

determining an attribute of the first data based on the threshold and the number of accesses to the first local address;

moving the first data from the first local address to a second local address based on the attribute;

mapping the first system address to the second local address;

changing a number of access to the second local address to the number of accesses to the first local address;

resetting the number of accesses to the first local address; and resetting numbers of accesses to respective local addresses in a period, wherein the determining further includes determining attributes of data for the respective local addresses in the period, and wherein the dynamically changing of the threshold includes changing, in a predetermined cycle, the threshold based on maximum and minimum values of the number of accesses to respective local addresses for the first data within the memory pool.

11. The operation method of claim 10, wherein the memory pool comprises one or more first memory units and one or more second memory units, wherein the moving the first data from the first local address to the second local address includes moving the first data to any one of the first and second memory units depending on whether or not the number of accesses to the first local address is equal to or more than the threshold.

12. The operation method of claim 10, wherein the changing of the threshold includes changing, in the predetermined cycle, the threshold to an average value of the maximum and minimum values of the number of accesses to respective local addresses for the first data within the memory pool.

13. The operation method of claim 10, wherein the changing of the threshold includes changing, in the predetermined cycle, the threshold to a smaller of a predetermined upper limit value and an average value of the maximum and minimum values of the numbers of accesses to respective local addresses for the data within the memory pool.

14. The operation method of claim 10, wherein the access command is a read command, and wherein when the attribute of the first data is determined to be changed, the first data read from the first local address is moved to the second local address.

15. The operation method of claim 10, wherein the access command is a write command, and wherein when the attribute of the first data is determined to be changed, write data received from the host is stored in the second local address.

16. The operation method of claim 10, further comprising:
acquiring the first data, the attribute of which is determined to be changed among all data within the memory pool, from a memory region corresponding to the first local address; and
moving the acquired data from the first local address to the second local address.

17. The operation method of claim 10, further comprising:
resetting numbers of accesses to respective local addresses in a period,
wherein the determining further includes determining attributes of data for the respective local addresses in the period.

* * * * *